Aug. 10, 1937.                M. HALPERN                2,089,790
METHOD OF FORMING A ROLLED JOINT
Filed July 24, 1935
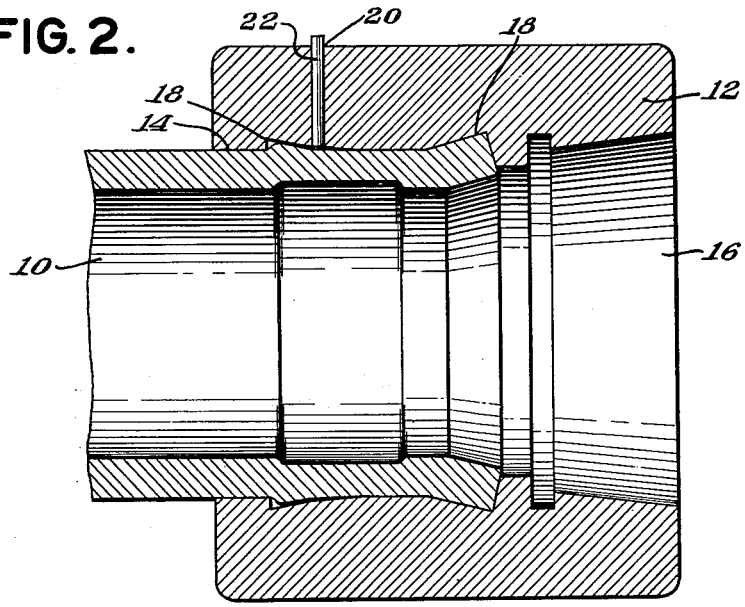
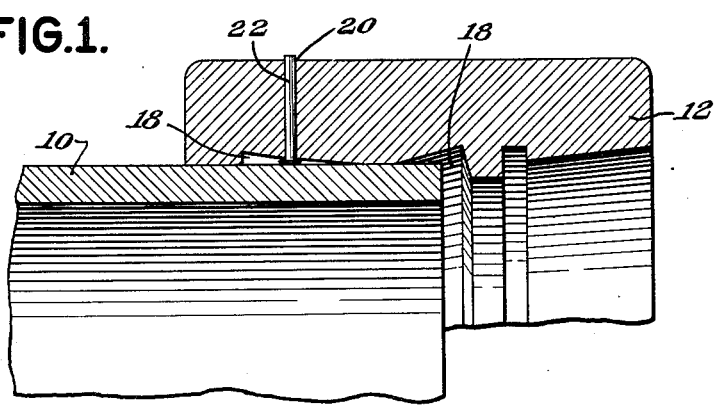
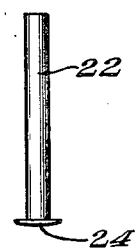
Michael Halpern
INVENTOR
BY
his ATTORNEY Patented Aug. 10, 1937

2,089,790

UNITED STATES PATENT OFFICE 2,089,790

METHOD OF FORMING A ROLLED JOINT

Michael Halpern, New York, N. Y., assignor to The Texas Company, New York, N. Y., a corporation of Delaware Application July 24, 1935, Serial No. 32,890

3 Claims. (Cl. 29—148.2)

This invention relates to a method of forming a rolled joint between a tube and a connecting member, and more particularly to a method for determining the extent to which the pipe or tube has been rolled or expanded into the connecting member.

The principal object of the invention is to provide a method which can be easily carried out and by means of which an efficient joint will be made while providing for an accurate measurement so that the operators will know when the tube has been rolled sufficiently to form a safe and permanent joint.

It is essential that great care be exercised in the rolling of tubes into headers and junction boxes, particularly where the apparatus being built or repaired forms part of a liquid heater such as an oil still or preheater. Obviously, if a tube is not rolled sufficiently in making the connection, a leak or blow-out may occur with disastrous effects. On the other hand, over-rolling of a tube produces unnecessary thinning of the end of the tube, thus resulting in a shortened life of the tube.

In the past it has been fairly common practice for the operator to continue the rolling operation until he is of the opinion that the tube has been sufficiently rolled and then to carefully caliper the interior of the tube for a distance of five or six inches from the end so that he may determine whether the tube has been fully rolled or whether additional rolling is necessary. This measuring of the tube obviously takes considerable time and, furthermore, it has been found that this method has been subject to many errors, this being particularly true in the case where tubes are rolled into connections which have previously been provided with grooves or indentations on their inside surfaces. In order to form a tight and secure joint it is apparent that the metal of the tube should be rolled so that it will substantially fill these grooves.

In accordance with this invention, at least one and preferably a plurality of small holes are first drilled through the connecting member at right angles to the axis of the opening into which the tube is to be rolled. A soft metal pin, slightly smaller in diameter than the hole and greater in length than the thickness of the connecting member, is then placed through each hole with the head of the pin on the inside. The tube is then placed in position in the connecting member, the head of the pin resting against the outer surface of the tube, and the rolling operation is conducted. The tube in expanding will force the pin outwardly through its hole in the connecting member and by measuring that portion of the pin which projects from the connecting member before and after the rolling operation, and comparing the distance which the pin is forced outwardly with the known depth of the groove in the connecting member, it can be determined with extreme accuracy whether or not the metal of the tube has been sufficiently expanded into the groove so that a proper joint will result.

For a better understanding of the invention reference may be had to the accompanying drawing in which Fig. 1 is a sectional elevation through a portion of a connecting member showing the end of a tube in position to be rolled, Fig. 2 is a sectional elevation showing the joint after the tube has been rolled and with the pin projecting from the connecting member, and Fig. 3 is an enlarged view of one form of measuring pin.

Referring to the drawing, the end of a tube 10 which may be a preheater tube such as is used in the treatment of hydrocarbon oils, is shown, together with a portion of a member 12 to which the tube is to be connected. The latter member may be any object to which the tube is to be secured by being rolled in such as a header, a junction box or a fitting such as a return bend. The member 12 is provided with an opening 14 for each tube and a bend or other fitting may be suitably secured to the portion 16 of the opening 14 opposite the end of the tube 10. The connecting members are usually provided with annular grooves 18 around their inner surfaces, the purpose of these grooves being to cooperate with the metal of the tube after the latter has been rolled or expanded, to thus secure the tube more firmly in position. In Figure 1 the end of a tube 10 is shown in position 40 within the connecting member 12 but before any rolling has taken place, while in Figure 2 the tube is shown after rolling, and it will be observed that part of the metal of the tube has been expanded or forced outwardly into the grooves 18 of the connecting member.

As has been explained hereinbefore, it has been customary in the past to caliper, from time to time during the rolling operation, the interior of the end portion of the tube being rolled, but this way of determining the extent to which the tube has been rolled requires considerable time and is often not accurate due to various reasons, such as the presence of irregularities in the tube or connecting member.

In carrying out the invention, a plurality of relatively small holes 20 are drilled through the grooved portions of the connecting member in a direction preferably perpendicular to the axis of the opening 14. These openings 20 may be drilled either from the exterior or the interior of the connecting member or, if preferred, the openings may be formed in the member when it is made. Only one of the openings 20 is shown in the drawing but it is to be understood that as many of these openings may be formed as desired, and a plurality of the openings are preferably formed in a circle around the grooved portions of the connecting member. Prior to placing the tube 10 in position within the connecting member 12 a small metal pin 22 preferably provided with a relatively flat head 24 is placed in each of the openings 20 from the inside, that is, with the head of the pin in the opening 14. The pins 22 are preferably formed of a relatively soft metal such as copper and are of a length such that they will project a slight distance from the outside surface of the connecting member 12 when in the position shown in Figure 1, that is, before the rolling operation has taken place. After the pins 22 are placed in the holes 20 the tube 10 may be inserted in the opening 14, the heads 24 of the pins 22 abutting against the outside surface of the connecting member. The projecting portion of each pin 22 is then measured by means of any suitable calipering instrument. The rolling operation is then conducted and, as will be observed with reference to Figure 2, part of the metal of the tube 10 is forced into the grooves 18 thus pressing the pins 22 outwardly. The heads 24 of the pins being substantially flat will not interfere with the rolling of the tube into the grooves. After the rolling operation has been completed the projecting portion of each pin is again carefully measured, and if the tube has been properly and sufficiently rolled, the difference in the lengths of the projecting portions of the pins before and after the rolling operation should be substantially equal to the depth of the grooves 18 at the points where the pins are located.

It will thus be seen that a simple and effective method has been provided for forming rolled joints which will be strong, tight and safe. By leaving the ends of the pins projecting, as is shown in Figure 2, a permanent indication will be made showing that the tube has been properly rolled into the connecting member.

Obviously many modifications and variations of the invention, as hereinbefore set forth, may be made without departing from the spirit and scope thereof, and therefore only such limitations should be imposed as are indicated in the appended claims.

I claim:

1. The method of making a rolled joint between a tube and a connecting member, which comprises forming a small hole through said connecting member at right angles to the longitudinal axis of the opening in said member, placing in the hole so formed a pin slightly longer than the thickness of the wall of said connecting member, placing the tube in the connecting member in position to be rolled, conducting the rolling operation whereby the metal of the tube is expanded into said connecting member, and measuring that portion of the pin which projects outwardly from the connecting member before and after said rolling operation.

2. The method of making a rolled joint between a tube and a connecting member, which comprises forming a small hole through said connecting member at right angles to its longitudinal axis, placing in said hole a headed pin slightly longer than the thickness of said connecting member, said pin being arranged with its head at the inner side of said connecting member, placing the tube in the connecting member in position to be rolled, the headed end of said pin being in contact with the outer surface of said tube, conducting the rolling operation whereby the metal of the tube in expanding will force the pin outwardly through the hole in said connecting member, and measuring that portion of the pin which projects outwardly from said connecting member before and after said rolling operation.

3. The method of making a rolled joint between a tube and a connecting member, said connecting member having an annular groove in its inner surface, which comprises forming a plurality of small holes through the grooved portion of said connecting member, said holes being angularly spaced in a plane passing through said groove and perpendicular to the longitudinal axis of said connecting member, placing a headed pin in each of said holes with the headed end of each pin at the inner side of the connecting member, placing the tube in the connecting member in position to be rolled, the headed ends of said pins being in contact with the outer surface of said tube, conducting the rolling operation whereby as the metal of said tube is expanded into the groove of said connecting member the pins are forced outwardly through said member, and measuring the portions of the pins which are thus forced outwardly of the connecting member.

MICHAEL HALPERN.